(12) United States Patent
Votipka

(10) Patent No.: US 6,405,238 B1
(45) Date of Patent: Jun. 11, 2002

(54) QUICK NAVIGATION UPON DEMAND TO MAIN AREAS OF WEB SITE

(75) Inventor: Bruce Votipka, Fort Collins, CO (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/127,655

(22) Filed: Jul. 31, 1998

(51) Int. Cl.[7] .................. G06F 15/16; G06F 15/00; G09G 5/00
(52) U.S. Cl. .................. 709/203; 707/513; 345/760
(58) Field of Search .................. 709/245, 203; 345/345, 352–353, 356–357, 704, 760, 853–855; 707/501, 513

(56) References Cited

U.S. PATENT DOCUMENTS

| 5,625,781 | A | * | 4/1997 | Cline et al. ............... 345/335 |
| 5,787,254 | A | * | 7/1998 | Maddalozzo ............... 709/228 |
| 5,933,827 | A | * | 8/1999 | Cole et al. ............... 707/10 |
| 6,189,018 | B1 | * | 2/2001 | Newman et al. ........... 707/501 |
| 6,230,185 | B1 | * | 5/2001 | Salas et al. ............... 709/205 |
| 6,266,681 | B1 | * | 7/2001 | Guthrie ................. 707/501 |

OTHER PUBLICATIONS

Kirsanov, D., "Designing Site Navigation," www.webreference.com/dlab/9705, pp. 1–14, May 1997.*

Rosenfeld, L., "30–Minute Web Site Tune–Up," WebReview.com, pp.1–4, Jan. 1997.*

Nielsen, J., "The Rise of the Sub–Site," Alertbox, ZDNet, pp. 1–2, Sep. 1996.*

Bickford, P., "Out of the Labyrinth: Mapping Sites with Menus," Netscape Corp., developer.netscape.com/viewsource/bickford_mapping/bickfordmapping.html, pp. 1–5, Sep. 1997.*

"Simple Select Menu," www.webreference.com/javascript/960923/part01.html, pp. 1–2, Sep. 1996.*

"Modifiable Select Menus II," www.webreference.com/javascript/960902/select_boxes.html, pp. 1–4, Sep. 1996.*

"View Source Articles," developer.netscape.com/viewsource/archive/archivelist.html, pp. 1–8, Jan. 1999.*

* cited by examiner

Primary Examiner—Zarni Maung
Assistant Examiner—Andrew Caldwell

(57) ABSTRACT

A web site navigation technique is presented wherein each web page along at least one link-traversable path of a web site presents a drop down link selection list activator. Upon activation, event handler script displays a drop down link selection list in a pop-up frame overlaid over a web page currently being displayed. The drop down link selection list presents a plurality of predefined links to most frequency accessed web pages associated with the web site, indicating hierarchical relationships between the links. Upon selection of one of the predefined links from the drop down link selection list, the web page associated with the selected link is loaded and displayed.

7 Claims, 5 Drawing Sheets

QUICK NAVIGATION UPON DEMAND TO MAIN AREAS OF WEB SITE

FIELD OF THE INVENTION

The present invention pertains generally to internet navigation, and more particularly to a method and on-demand tool for directly navigating to certain web pages in a web site.

BACKGROUND OF THE INVENTION

Traditionally, browsers implement navigation to other areas, or "web pages", on a web site via hyperlinks. A hyperlink, or simply "link", is special text in a page or a graphical icon associated with another web page. Links may also be present on a graphical image that includes regions associated with different pages. For example, a link defined as a graphical image of a human body may have different regions leading to different text pages. Thus, by clicking on the head, a text page of a medical diagnosis for the head is displayed; by clicking on the feet, a text page of medical diagnoses for the foot is displayed, and so on. Typically, when a link is activated (e.g., the user clicks on the link using a mouse), an internet browser downloads a HyperText Markup Language (HTML) web page from a host site and stores it in local memory. Common web browsers have a mechanism called a back link, or back button. This allows the user to retrace the path that was followed to arrive at the current page, and because the HTML data is available locally rather than requiring the data to be re-downloaded across the network, the path may be retraced more quickly.

One navigation tool frequently implemented in web sites is known as a "site map". A site map is typically designed to provide a comprehensive view of all elements on the site, generally in an expanded index format. Site maps generally display a text or graphical map of the web site, and, depending on the complexity of the site map, may or may not provide links to pages at the top of each sub-hierarchy of the major sections of the web site. The site map itself is a complete and separate web page that must be loaded in order to view. Because the links provided in a site map tend to be only to those web pages heading the major sub-sections of the site, and since web pages heading major sub-sections typically do not include substantive information but rather only links to other web pages that lead to pages that contain the substantive information of interest to the particular user, site maps therefore tend to provide only indirect links to web pages containing substantive information of interest to users.

Using current navigation technology, an inconvenience often occurs when a user is displaying a page somewhere in a web site, and has a need to view another page elsewhere in the web site in order to complete a task. In the prior art, the user must navigate from one web page to another via the hierarchical links on each page, or by using the browser's "back" button. In a large web site, navigation through a lengthy path of links may be quite cumbersome and time-consuming. What is needed is a method and mechanism for bypassing lengthy hyperlink paths in order to easily navigate to different web pages in a web site.

One method currently used for avoiding the requirement to traverse through each link in the web site is to display a series of links on each page in the web site. This method, however, is very costly in terms of consumption of available viewing space on each page. Furthermore, the space consumed by the series of links on each page provides only redundant information. It reduces the amount of available display space for useful non-redundant information available to the user, and additionally still takes some time to use. In addition, redundant series of text links do not scale very well due to display resolution, aspect ratio, or practical user viewing limitations. One method for limiting the space taken up by the series of text links on each page is to confine the series of links to a limited viewing window that is scrollable via a scrollbar. However, this method requires scrolling to view the available links, thereby lessening its convenience. The same scaling problem exists when the links are graphical elements.

Another method currently used to quickly navigate to a desired page on the internet is via the use of bookmarks. Bookmarking is a tool provided by internet browsers that allow a user to directly link to a favorite site or page in a web site by allowing a customizable user-selectable bookmark list. Bookmarks save the internet address of the associated web page in user-friendly hyperlink form. Thus, the selection of the desired bookmark from the bookmark list in the browser causes the web page associated with the bookmark to be downloaded and displayed by the browser without requiring the user to navigate to the site manually via a hyperlink path. However, before a bookmark can be saved as a bookmark, the user must still actually navigate to the desired page and manually add the address of the page as a bookmark. Furthermore, the addition of more than a few pages in a web site as bookmarks results in user cognitive overload, which can only be remedied by implementing some type of bookmark management (e.g., the creation of web site directories in the bookmark list).

SUMMARY OF THE INVENTION

The present invention is a navigation mechanism and method of operating the same that allows users to very easily and with very few key strokes navigate to main areas of a web site without having to use traditional methods that are available through HTML. Using the web browser the user can navigate very easily to main areas of the site. The invention overcomes the problems of the prior art by creating a drop down link selection list that occupies minimal display space but allows a user to simply select the list, pick a link to a web page entry, and navigate directly to the selected web page. The drop down selection list tool of the invention allows any number of directly accessible web pages to be listed, yet the entire list becomes visible only on demand by the user which results in only a minimal amount of display overhead while the user is viewing the main display. In addition, because the size and format (i.e., placement of listed items) of the drop down list when presented to the user is determined by the web site designer, relationships, such as the position in the site hierarchy of a particular page, are easily presented.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

The mechanism of the invention is a drop down link selection list that occupies minimal display space but allows a user to simply select the list, pick a link to a web page entry, and navigate directly to the selected web page. The drop down selection list tool of the invention allows any number of directly accessible web pages to be listed, yet the entire list becomes visible only on demand by the user which results in only a minimal amount of display overhead while the user is viewing the main display. In addition, because the size and format (i.e., placement of listed items) of the drop down list when presented to the user is determined by the web site designer, relationships, such as the position in the site hierarchy of a particular page, are easily presented.

Figure 1:
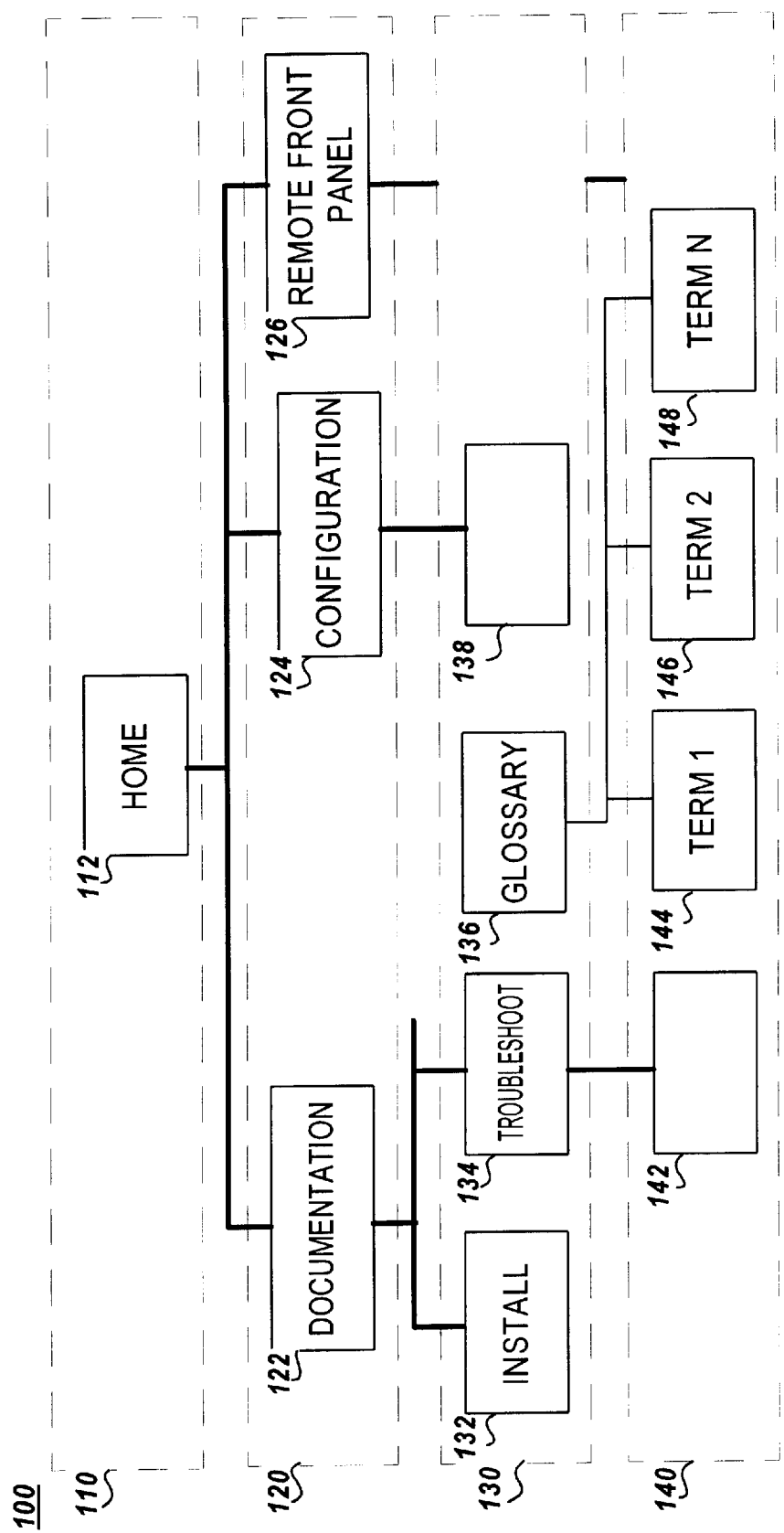
FIG. 1 is a block diagram of a web site.

FIG. 1 is a block diagram of a typical web site 100. Web site 100 is organized in some type of hierarchical arrangement to allow the user to accomplish a specific task. At the top level 110 of the hierarchy is a home page 112, sometimes called a lodge page or an entry page, which informs the user of the functionality of the web site 100. On the next level 120 of the hierarchy are HTML pages 122, 124, 126 that operate to segregate the functionality of web site 100 into major sections. For example, if web site 100 is designed to provide user information about a particular product, the major sections may include a documentation section page 122 which links to specific areas of the documentation at lower levels 130, 140 in the hierarchy. These lower level pages 132, 134, 136, 142 may include instruction pages for product installation 132, product troubleshooting 134, and a glossary 136. The glossary page 136 may include links to pages on lower level 140 defining specific terms used throughout the website. For example, the glossary page 136 may include links to definition page 144 associated with the term "Term 1", definition page 14 associated with the term "Term 2", and definition page 148 associated with the "Term N".

The major section pages 122, 124, 126 may also include a configuration section page 124 that operates as a web-based interface to the product and allows the user to set up and modify the configuration of a remote product. For example, if the product is a piece of test equipment, the configuration page 124 includes links to lower level pages 138 that allow the user to change the settings on the instrument, change the range of values that it is measuring or the period of time over which it measures, etc. Another major section page may include a remote front panel page 126 that also operates as a web-based interface to the product and allows the user to actually operate the instrument.

As previously described, a user viewing a web page often has a need to view another page elsewhere in the web site in order to complete a task. For example, a user operating the test equipment monitored by web site 100 may be viewing a lower-level page under the remote front panel page 126 and require user documentation on a particular mode of operation in order to continue. Or, as another example, the user may be displaying a troubleshooting page 142 which instructs the user to order supplies via another indirectly-linked page in the web site.

Figure 2:
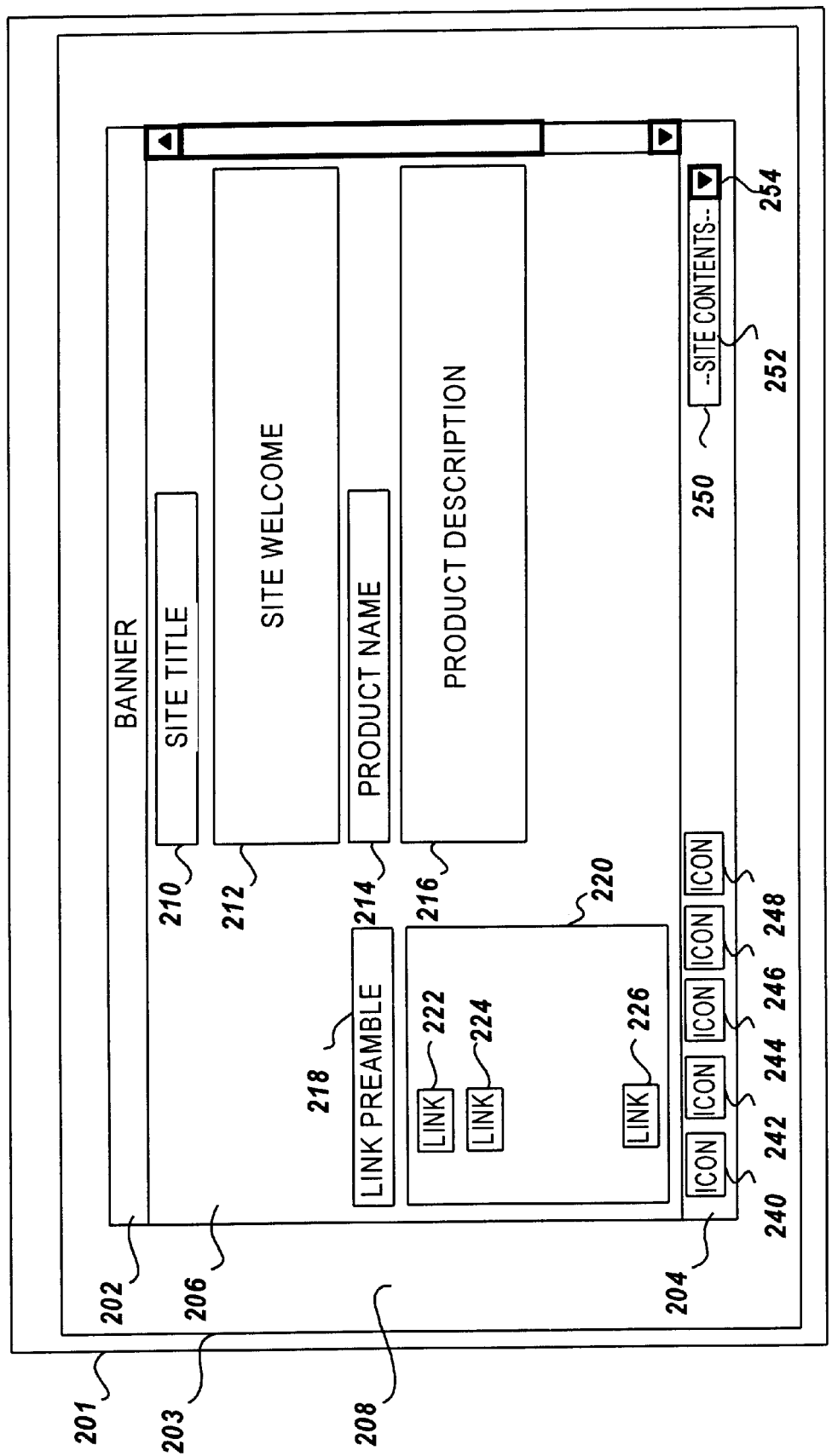
FIG. 2 is a diagram of one embodiment of a home page for a web site.

FIG. 2 is an illustrative embodiment of a home page 112 of web site 100 displayed in web page frame 203 of internet browser 201. Page 112 includes application banner 202, application navigation bar 204, application frame 206, and background 208. Within the application frame 206 the HTML home page of web site 100 is displayed. The format of the home page is customizable by the developer and hence may take on any number of various display formats. In the illustrative embodiment, the home page includes site title 210, site welcome 212, product name 214, product description 216, link preamble 218, and link list 220. Link list 220 includes a number of links 222, 224, 226, in text or graphical format, to other pages in the web site. If the number of links dictate, link list 220 may include a scrollbar that allows a limited number of links to be displayed in the selection list frame at any given time.

Figure 3:
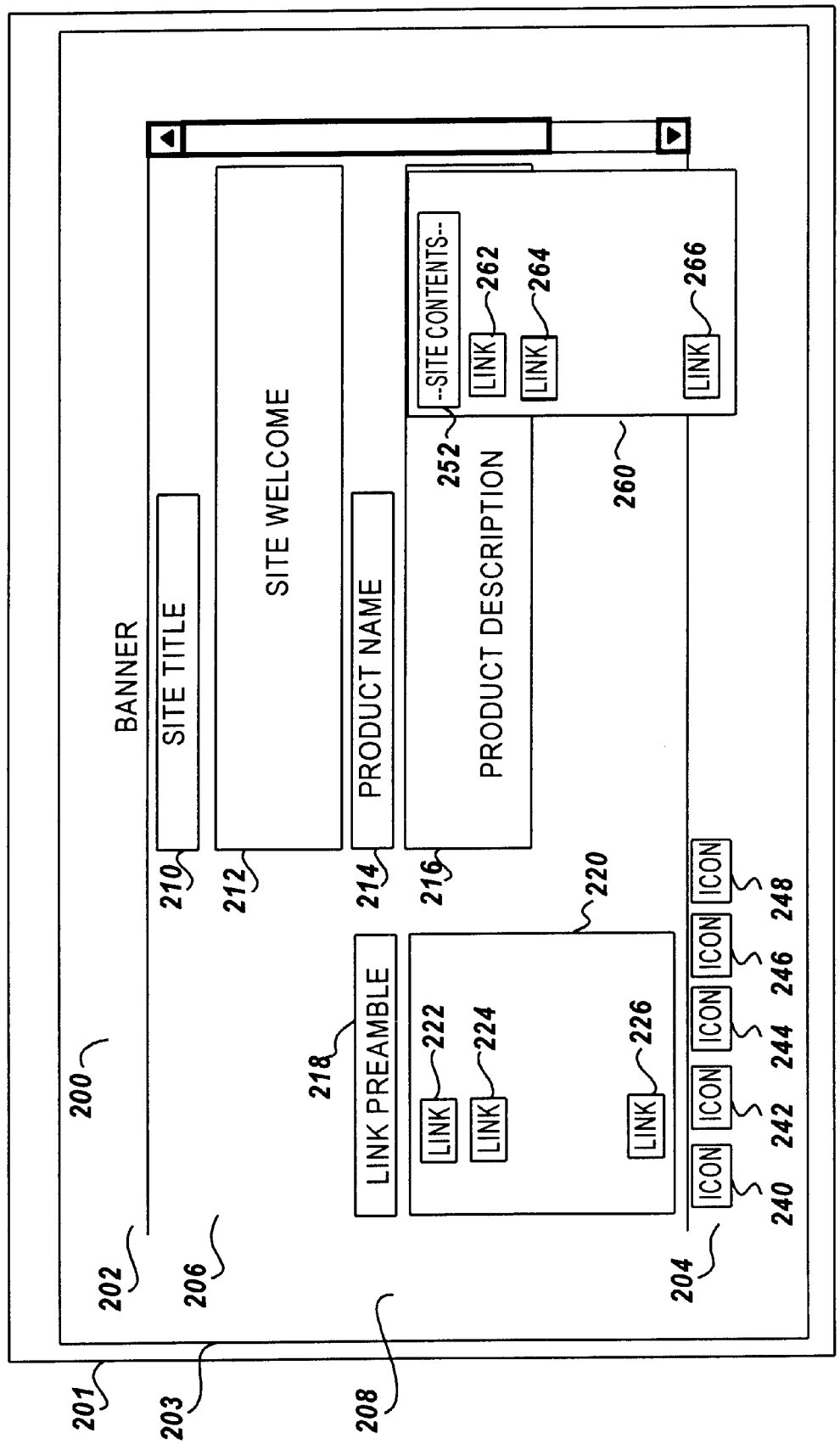
FIG. 3 is a diagram illustrating a drop down link selection list when displayed on demand by a user.

In accordance with the invention, a drop down link selection list 250 is provided to allow the user to navigate directly to certain pages associated with a list of pre-defined links. In the illustrative embodiment, drop down link selection list 250 occupies a section of navigation bar 204, which is present regardless of the page being displayed in application frame 206. It will be understood, however, that the location of drop down link selection list 250 could be anywhere on the web page display. Drop down link selection list 250 displays a prompt 252. When prompt 252 is activated by the user via a mouse click, selection list frame 260 is presented, as illustrated in FIG. 3. When a user clicks on prompt 252, a selection list frame 260 appears in which the contents of the drop down link selection list 250 is displayed. In the illustrative embodiment shown in FIG. 3, prompt 252 is displayed as "—Site Contents—" and drop down link selection list 250 comprises prompt 252 at the top of the frame display, followed by link 262, link 264, through link 266. If the user clicks on any of links 262, 264, 266, the web page associated with the selected link is loaded and displayed in the application frame 206.

When designing a web site, the designer will generally choose links to the most commonly accessed web pages in the site to include in the drop down link selection list 250. This allows the user to simply click on prompt 252 to display the drop down link selection list 250, select the desired link from the list, and load the web page directly without having to retrace the path of links followed to arrive at the web page.

The developer of the web site may format the arrangement of the links in drop down link selection list 250, as displayed in selection list frame 260, to indicate various hierarchies and relationships between the different web pages associated with the various links. If the links in list 250 are displayed in text mode, relationships may be illustrated through the use of indentation or via special characters. For example, links to level 1 web pages may be illustrated with no indentation; links to level 2 web pages may be illustrated with a single indent; links to level 3 web pages may be illustrated with two indents; and so on. In another embodiment, the links may be presented in a table of contents format using numbering, bullets, or special characters.

Figure 4:
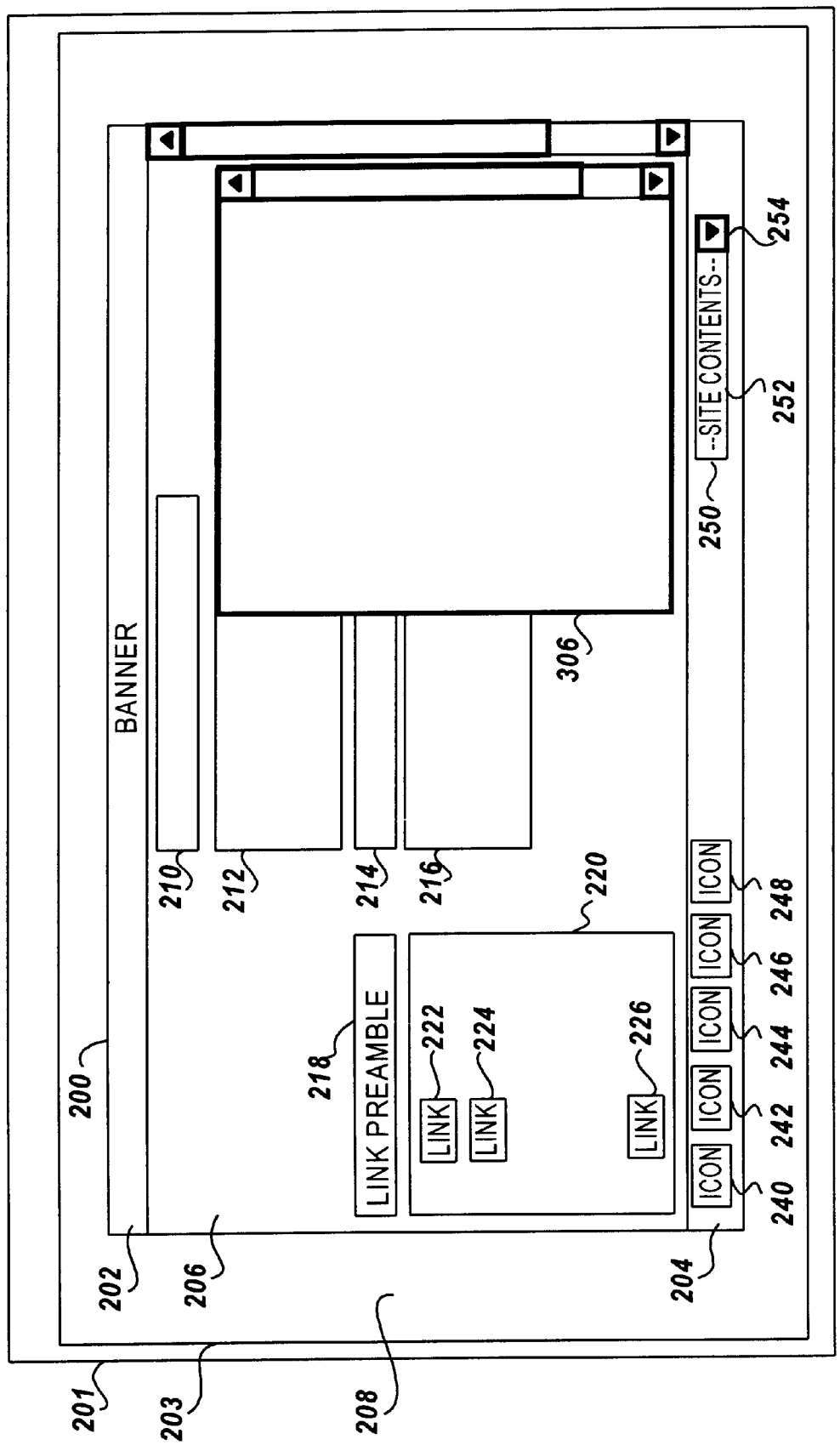
FIG. 4 is a diagram illustrating a pop-up frame in which a user-selected web page is loaded upon selection of a link from a drop down link selection list.

In contrast to a site map, the drop down link selection list of the invention is always present regardless of the web page currently displayed in the application frame and provides a direct link to those web pages containing substantive information that have been determined by the site developer to be of most frequently accessed by, or of most interest to, the user. The links may be associated with web pages on any level of the web site, and not just to the pages at the top level of major sections of the site. In one embodiment, the web page associated with the user-selected link from the drop down link selection list is displayed in the application frame. In an alternative embodiment, illustrated in FIG. 4, the web page associated with the user-selected link is displayed in another pop-up frame 306. This embodiment circumvents the need for the user to change the current context. In other words, the web page displayed in application frame 206 before selecting a link from drop down link selection list 250 remains on the display, and the web page associated with the user-selected link pops up in a separate frame over application frame 206 to allow the user to view the desired information from the web page associated with the user-selected link without changing the context of the web page displayed in the application frame.

Figure 5:
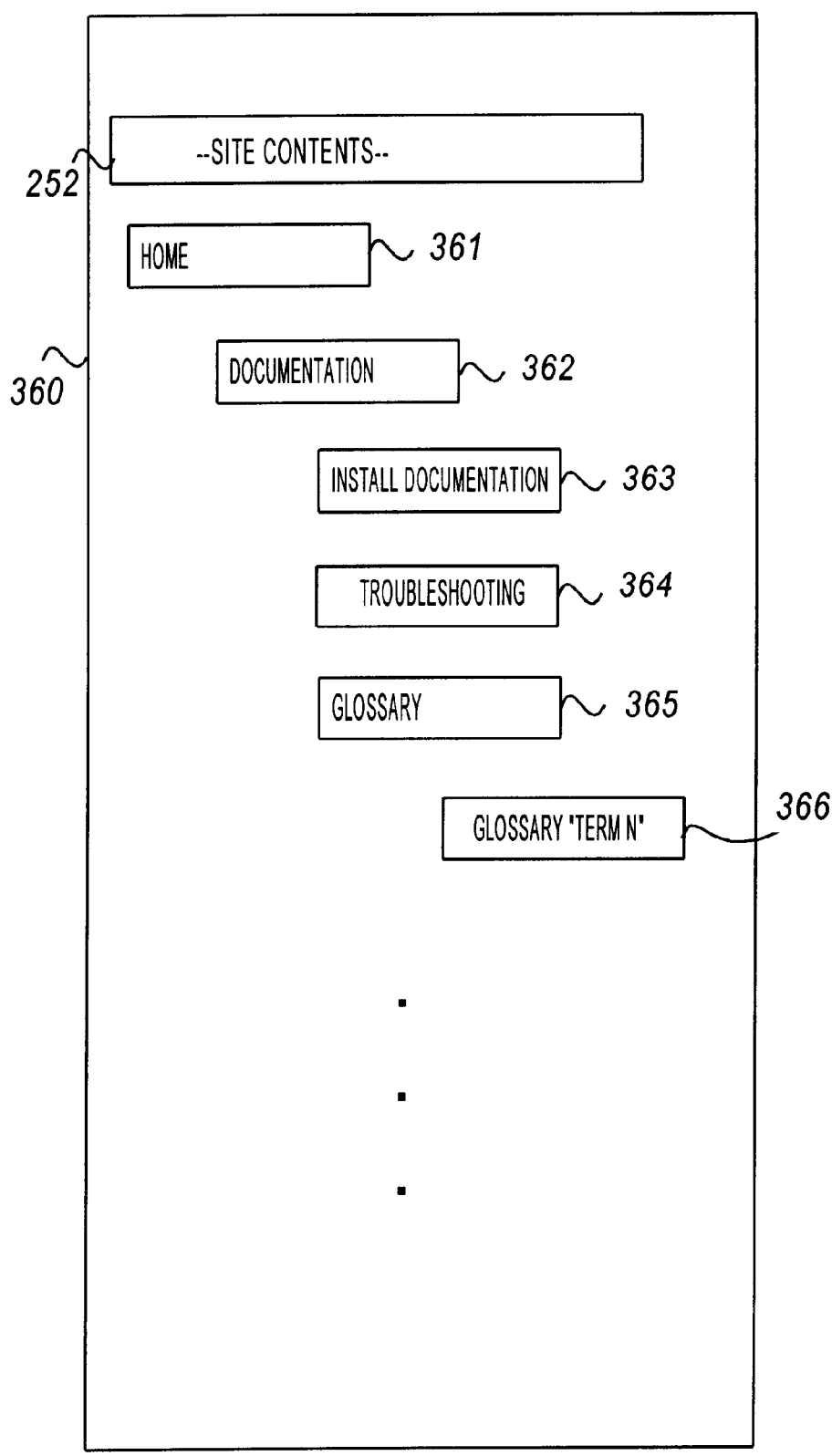
FIG. 5 is a diagram illustrating an example implementation of a link selection frame displayed when a drop down link selection list associated with the web sit of FIG. 1 is activated.

The utility of the invention will be appreciated by the following example, with reference to FIG. 5, which illustrates an example implementation of a selection list frame 360 associated with a drop down link selection list 250 implemented for web site 100. In this example, the drop down link selection list includes links 361–366 to, among others, Home page 112, Install page 132, Troubleshoot page 134, and Term N page 145. In order to indicate the hierarchical relationships between the pages associated with the links in the drop down link selection list, in this example, each graphical indentation prior to a link indicates one level down the web site hierarchy. Accordingly, with reference to FIG. 1, the Home page link 361 is fully left justified to indicate that the associated Home page 112 is at the top level of the web site hierarchy. The Documentation page link 362 is indented once to indicate that the associated Documentation page 122 lies in the second level of the hierarchy. The Install Documentation page link 363, Troubleshoot link 364, and Glossary link 365 are each indented twice to indicate that the associated Install page 132, Troubleshoot page 134, and Documentation page 136 lie in the second level of hierarchy. The Term N link 366 is indented three times to indicate that the associated Term N page 148 lies in a fourth level of the web site hierarchy. For purposes of illustration, suppose a user is displaying a web page in application frame 206 that describes product installation instructions that uses a term "Term N"that is unfamiliar to the user. By activating the drop down link selection list 250 to display the selection list frame 360 of FIG. 5 that includes the link to the "Term N" page 148 (see FIG. 1), the user can display, on a pop-up frame 306, the definition of the term "Term N" to determine its meaning without having to change the context of application frame 206 (i.e. navigate through a series of links with associated web pages, each of which is loaded by the internet browser and displayed in application frame 206).

It will be appreciated from the above discussion that the invention provides inherent advantages over the prior art. The drop down link selection list eliminates interference with user productivity and unnecessary consumption of viewing space over textual links that are automatically displayed on each web page by presenting the list only upon user demand. The invention overcomes similar problems associated with displaying graphical icons on each page, and additionally eliminates scalability and icon interpretation problems that are encountered as the number of icons increases. Finally, the drop down link selection list of the invention provides the advantage over the bookmarking tool provided in various browsers because it does not require the user to actually navigate to the web page itself to add it as a bookmark, and it is available and consistent independent of the type of browser technology (i.e., it runs on UNIX browsers, Internet Explorer, Netscape Navigator, etc.). Instead, in the drop down link selection list of the invention, the links made available are customizable by the web site developer to include those most commonly accessed web pages, or those of most interest, in its site. Thus, the list of available links is embedded in the web site itself. Accordingly, the user need not build a sequence of bookmarks or bookmark management scheme. The links are predefined by the site developer and are always available to the user to navigate directly to desired web pages using the fewest keystrokes, in the simplest manner, and independent of the technology of the particular browser being used. Furthermore, because only the particular links actually included in the drop down link selection list change from web site to web site, the navigation tool of the invention provides a consistent interface that appears similarly across commonly owned or related web sites. For example, a manufacturer of a number of products may provide a different product-specific web site for each manufactured product. Each product division may then independently determine the format of, and which links to include in, its own web site's drop down link selection list. A user visiting more than one web site of the same company then experiences the same drop down link selection list interface on all products, each with predefined product-specific links.

Table 1 is a client-side code listing illustrating an example HTML implementation of one embodiment of a drop down link selection list that is available on demand from every page in the web site in accordance with the invention. The code is written in Netscape® JavaScript language which is a cross-platform, object-based scripting language for client and server applications. The code in Table 1 is embedded directly in HTML pages and is interpreted by the browser completely at runtime.

TABLE 1

```
<hl>Sample Web Page</hl>
<p>
<ul>
<li><a href="configuration.html">Configuration</a>
<li><a href="documentation.html">Documentation</a>
<li><a href="order.html">Order Additional Parts</a>
<li><a href="contactvendor.html">Contact Us!</a>
</ul>
<p>
<p>
<form>
<select name="area" size=1 onChange="loadContent(this. form)">
    <option>--Site Contents--
    <option>Home
    <option>    Configuration
    <option>    Documentation
    <option>    Order Additional Parts
    <option>    Contact Us!
</select>
</form>
```

The drop down link selection list is implemented as an interactive form using the HTML <form> tag. The interactive form is implemented as a drop down list using the HTML <select> tag. Upon detection of a mouse click on the display area, which shows only the first selection option in the selection list (i.e., "—Site Contents—"), the interactive form listing the selection options, each specified using the HTML <option> tag, is loaded by the browser and displayed on the user's display. Hierarchical relationships between the available links listed in the drop down link selection list are indicated using indents (e.g., four spaces using JavaScript " "). Accordingly, in the illustrative embodiment, the "Home" link is shown without an indent, while the "Configuration", "Documentation", "Order Additional Parts", and "Contact Us" links are shown with one indent, indicating that the "Home" page is one level higher in the hierarchy of pages in the web site than the "Configuration", "Documentation", "Order Additional Parts", and "Contact Us" pages.

A user input detector, implemented with a JavaScript <onChange> event handler, monitors the drop down link selection list for changes. When a user selects the prompt for the drop down link selection list, the selection list frame appears on the user's display. The user selects either the prompt "—Site Contents—" or one of the links in the list. An index value, determined by the position of the selected option in the list (i.e., the position of the mouse when clicked inside the selection list frame), is returned by the user input detector.

Table 2 is a code listing illustrating an example HTML implementation of one embodiment of the server-side portion of JavaScript code for a drop down link selection list.

In this embodiment, a function called loadContent(form) executes when the client-side JavaScript <onChange> event handler detects a change. The page associated with the index value returned by the <onChange> event handler is loaded by the browser into the application frame. In the illustrative embodiment, index value "0" is associated with the prompt "—Site Contents—"; index value "1" is associated with the home page "home.html"; index value "2" is associated with the main configuration page "configuration.html"; index value "3" is associated with the main documentation page "documentation.html"; index value "4" is associated with the main ordering page "order.html"; and value "5" is associated with the main vendor contact page "contactvendor.html". Thus, if the index value is zero, which is associated with the prompt, the input is ignored. If the index value is "1", the home page is loaded into the application frame; if the index value is "2", the main configuration page is loaded; and so on.

TABLE 2

```
<html>
<head>
<script language="JavaScript">
<!--HIDE
function loadContent(form)
{
    var index = form.area.selectedIndex
    if ( index == 1) }
        top.body.location.href = home.html
    } else if (index == 2) {
        top.body.location.href = configuration.html
    } else if (index == 3) {
        top.body.location.href = documentation.html
    } else if (index == 4) {
        top.body.location.href = order.html
    } else if (index == 5) {
        top.body.location.href = "contactvendor.html"
    }
}
//Stop Hiding-->
</script>
</head>
```

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A navigation tool for a web page in a web site, said web site comprising a plurality of web pages and said web page being displayable by an internet browser, comprising:

a drop down link selection list event handler, said event handler responsive to activation of a drop down link selection list activator in a web page by displaying a plurality of predefined links to respective associated web pages in a drop down link selection list which indicates hierarchical relationships between said predefined links, detecting selection of one of said predefined links, and generating an indication of which of said predefined links has been selected, wherein said drop down link selection list activator is presented along at least one link-traversable path of said web site.

2. A navigation tool in accordance with claim 1, comprising:

a link event handler, said link event handler responsive to selection of one of said links in said drop down link selection list to load a web page associated with said link onto said user's display.

3. A navigation tool in accordance with claim 2, wherein:

said predefined links in said drop down link selection list are respectively associated with said web pages in said web site that are most frequently accessed.

4. A method for allowing direct navigation to predefined web pages in a web site from a user's display running an internet browser, said web site comprising a plurality of web pages each accessible via a link-traversable path, comprising:

presenting a drop down link selection list activator on each web page along at least one link-traversable path of said web site;

displaying one of said web pages containing said drop down link selection list activator;

detecting activation of said drop down link selection list activator presented on said displayed web page;

displaying a drop down link selection list associated with said drop down link selection list activator on said display, said drop down link selection list comprising a plurality of predefined links to respective associated web pages and indicating hierarchical relationships between said predefined links;

detecting selection of one of said predefined links from said drop down link selection list;

loading said web page associated with said selected predefined link; and displaying said web page associated with said selected predefined link.

5. A method in accordance with claim 4, wherein:

said step of detecting activation of drop down link selection list comprises:

displaying a prompt to activate said drop down link selection list; and detecting selection of said prompt.

6. A method in accordance with claim 4, comprising:

loading said web page associated with said predefined link in place of a web page currently being displayed on said user's display.

7. A method in accordance with claim 4, comprising:

loading said web page associated with said predefined link in a pop-up frame overlaid over a web page currently being displayed on said user's display.

* * * * *